United States Patent
Oh et al.

(10) Patent No.: US 6,738,623 B1
(45) Date of Patent: May 18, 2004

(54) METHOD FOR DYNAMICALLY ALLOCATING CHANNEL AT EXTENDED COVERAGE OF BASE TRANSCEIVER STATION IN MOBILE COMMUNICATION SYSTEM

(75) Inventors: Sung-Won Oh, Ichon-shi (KR); Joon-Sun Uhr, Ichon-shi (KR)

(73) Assignee: Hyundai Electronics Industries Co., Ltd., Kyoungki-do (KR)

(*) Notice: Subject to any disclaimer, the term of this patent is extended or adjusted under 35 U.S.C. 154(b) by 528 days.

(21) Appl. No.: 09/710,450

(22) Filed: Nov. 11, 2000

(30) Foreign Application Priority Data

Nov. 10, 1999 (KR) .......................................... 1999-49733

(51) Int. Cl.⁷ .............................. H04Q 7/20; H04B 7/15
(52) U.S. Cl. .................... 455/450; 455/452.2; 455/455; 455/509; 370/328; 370/341
(58) Field of Search .................... 370/450, 509, 370/436–439, 422.1, 432.1–435.3, 456.1, 456.2, 426.2, 452.1, 452.2, 453, 454, 455, 461, 319–320, 328–330, 340–341, 347, 519, 432, 441–442

(56) References Cited

U.S. PATENT DOCUMENTS

| | | | | |
|---|---|---|---|---|
| 5,109,390 A | * | 4/1992 | Gilhousen et al. | 455/434 |
| 5,276,703 A | * | 1/1994 | Budin et al. | 370/347 |
| 5,828,661 A | * | 10/1998 | Weaver, Jr. et al. | 370/331 |
| 5,841,767 A | * | 11/1998 | Nishi et al. | 370/329 |
| 5,930,722 A | * | 7/1999 | Han et al. | 455/502 |
| 5,999,816 A | * | 12/1999 | Tiedemann, Jr. et al. | 455/437 |
| 6,035,199 A | | 3/2000 | Barnett | 455/448 |
| 6,052,596 A | | 4/2000 | Barnickel | 455/450 |
| 6,055,432 A | | 4/2000 | Haleem et al. | 455/452 |
| 6,081,536 A | | 6/2000 | Gorsuch et al. | 370/468 |
| 6,108,321 A | | 8/2000 | Anderson et al. | 370/329 |
| 6,119,011 A | | 9/2000 | Borst et al. | 455/452 |
| 6,223,041 B1 | * | 4/2001 | Egner et al. | 455/452.2 |
| 6,226,283 B1 | * | 5/2001 | Neumiller et al. | 370/340 |
| 6,252,861 B1 | * | 6/2001 | Bernstein et al. | 455/437 |
| 6,332,079 B1 | * | 12/2001 | Kim et al. | 455/446 |
| 6,493,331 B1 | * | 12/2002 | Walton et al. | 370/341 |
| 2001/0036810 A1 | * | 11/2001 | Larsen | 455/11.1 |
| 2003/0123428 A1 | * | 7/2003 | Lakaniemi et al. | 370/352 |

* cited by examiner

*Primary Examiner*—Sinh Tran
*Assistant Examiner*—Kamran Afshar
(74) *Attorney, Agent, or Firm*—Baker Botts LLP (57) ABSTRACT

A method for dynamically allocating a traffic channel element at an extended coverage of a base transceiver station which is divided by a cell site modem (CSM) ASIC in a mobile communication station is disclosed. In case that the call coverage is divided into a normal and an extended regions, the traffic channel element is not set to a pair of the normal and the extended channel elements. Instead, the channel allocation is dynamically allocated according to a channel type which is necessary on a call set up at each of the regions. The method reduces an unnecessary channel allocation and an occupation time of the channel elements, thereby enabling the capacity of the system to be increased.

10 Claims, 7 Drawing Sheets

METHOD FOR DYNAMICALLY ALLOCATING CHANNEL AT EXTENDED COVERAGE OF BASE TRANSCEIVER STATION IN MOBILE COMMUNICATION SYSTEM

FIELD OF THE INVENTION

The present invention relates to a mobile telecommunication system adapted by a Code Division Multiple Access (CDMA) scheme of a digital cellular system (DCS) or a personal communication system (PCS); and, more particularly, to a method of dynamically allocating a traffic channel element at an extended coverage of a base transceiver station which is divided by a cell site modem (CSM) ASIC in a mobile communication system.

DESCRIPTION OF THE PRIOR ART

Figure 1:
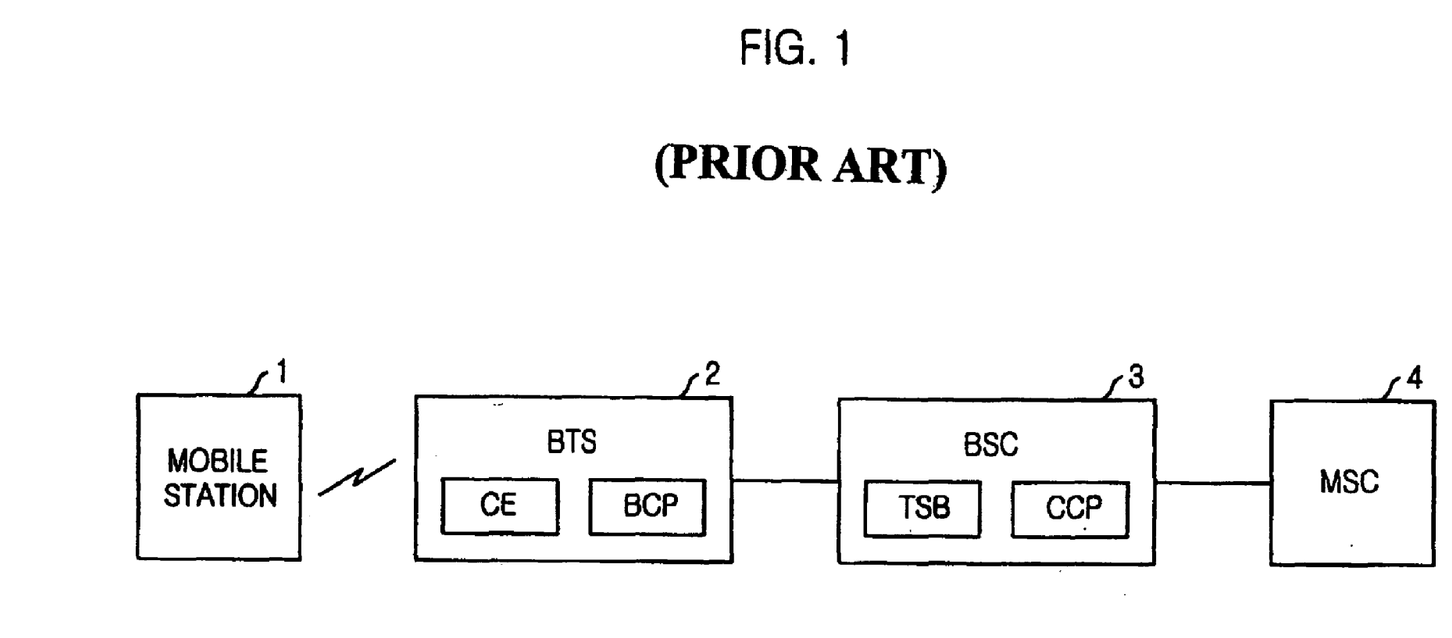
FIG. 1 is a block diagram of a general mobile telecommunication system.

FIG. 1 shows a general mobile telecommunication system adapted by a CDMA scheme of a digital cellular system (DCS) or a personal communication system (PCS). As shown in FIG. 1, the mobile telecommunication system comprises a mobile station 1, a base transceiver station 2, a base station controller 3 and a mobile switching center 4. The base transceiver station 2 receives or transmits data from/to the mobile station 1 and controls the operation of the reception and transmission. The base station controller 3 receives or transmits data from/to the base transceiver station 2 and controls the operation of the reception and transmission.

The above described mobile telecommunication system utilizes a global positioning system (GPS) to synchronize a timing thereof. All of mobile stations generate signals according to a reference clock signal.

Each of the generated signals is delayed according to a moving distance thereof. Therefore, a phase delay phenomenon is generated in each of the signals. In order to overcome the phase delay phenomenon, each of the stations receiving the phase delayed signal has to perform an exact phase tracking to demodulate the received signal.

However, the cell site modem ASIC, which is contained at a channel card of the base transceiver station 2 and used as a channel element (CE), has 512 PN chip of a phase tracking boundary (1 PN chip=813 nsec). The 512 PN chip can be represented as 125 Km of a radio wave moving distance.

Since the 125 Km represents the distance of a radio wave running between the base transceiver station 2 and the mobile station 1, a call possible coverage becomes within the radius of 62.5 Km centered from the base transceiver station 2.

Accordingly, the coverage of the mobile telecommunication system of one cell site modem ASIC is limited to 60 Km. In general, a cell area of the downtown is within the radius of 7 Km according to a capacity of the mobile telecommunication system.

However, in order to provide a mobile telecommunication service in a country area such like a coastal area or an island area, a pair of cell site modem ASICs is used to extend the call possible coverage. The pair of cell modem ASICs is made with a simple hardware modification and a software control. Accordingly, it is not necessary to redesign the cell site modem ASIC.

That is, a phase tracking of the cell site modem ASIC at a normal region within 60 Km is possible with zero to 512 PN chip. Another phase tracking of the cell site modem ASIC at an extended region from 60 to 120 Km is possible with 512 to 1024 PN chip.

As described above, the call coverage is divided into the normal region and the extended region according to the cell site modem ASIC. At this time, in case that the mobile station moves from the normal region to the extended region or moves from the extended region to the normal region, a common region or a handoff region has to be necessary so as to enable both the cell site modem ASICs to perform the phase tracking.

Accordingly, the call coverage is divided into the normal region, the handoff region and the extended region. And, a various point is set according to the movement of the mobile station. In case that the mobile station moves from the normal region to the extended region, an Extended Call Add Point, a Normal Call to Extended Call Swap Point, a Normal Call Drop Point are set. On the contrary, in case that the mobile station moves from the extended region to the normal region, a Normal Call Add point, an Extended Call to Normal Call Swap Point, and an Extended Call Drop Point are set.

In addition, an access channel of the handoff region is determined by an intermediate value of a round trip delay (RTD). In case that a value is less than the intermediate value, it is processed as the access channel of the normal region. In case that another value is larger than the intermediate value, it is processed as the access channel of the extended region.

However, the prior mobile telecommunication system has to utilize both the cell site modem ASICs as one pair of channel elements in order to perform the above described call process in the extended coverage of the base transceiver station. Although each of call processes at a normal region and the extended region, excluding the call process at the handoff region, needs only the one of the pair of channel elements, the other cannot be utilized. And thus, there occurs an unnecessary channel allocation.

SUMMARY OF THE INVENTION

It is, therefore, a primary object of the invention to provide a method for dynamically allocating a traffic channel element at an extended coverage of a base transceiver station which is divided by a cell site modem (CSM) ASIC in a mobile communication station. In case that the call coverage is divided into a normal and an extended regions, the traffic channel element is not set to a pair of the normal and the extended channel elements. Instead, the channel allocation is dynamically allocated according to a channel type which is necessary on a call set up at each of the regions. Thereby, it is possible to reduce an unnecessary channel allocation and an occupation time of the channel element.

In accordance with the present invention, there is provided a method of dynamically allocating a channel at an extended coverage of a base transceiver station in a mobile communication system, comprising the steps of: (a) measuring, in case that a call setting requirement or a page response is received from the base transceiver station, a round trip delay (RTD) value at a channel element (CE) of the base transceiver station to report a measured RTD value to a transcoder & selector bank (TSB) of a base station controller; (b) confirming a position of the mobile station based on the measured RTD value and determining a CE allocation type corresponding to the position of the mobile station; (c) if the RTD value is larger than a cutoff, recognizing that the mobile station is located within an extended region, thereby allocating an extended CE; (d) performing an extended call process by using the extended CE; (e) if the RTD value is less than the cutoff, recognizing that the mobile station is located within a normal region, thereby allocate a normal CE; and (f) performing a normal call process by using the normal CE.

The method for dynamically allocating a channel at an extended coverage of a base transceiver station in accordance with the present invention further comprises the steps of: (g) comparing, during the normal call process according to a normal channel allocated in step (e), the RTD value to an extended add value, and, performing, in case that the RTD value is larger than the extended add value, an extended add operation to additionally allocate an extended channel, and, otherwise, returning to the step (f); (h) comparing the RTD value to a swap-to-extend value, performing, in case that the RTD value is larger than the swap-to-extend value, a region swap operation to enable the normal channel to be inactive and simultaneously to enable the extended channel to be active, and performing, in case that the RTD value is less than the swap-to-extend value, comparing the RTD value to the swap-to-extend value; and (i) comparing the RTD value to a normal drop value, performing, in case that the RTD value is larger than the normal drop value, a region drop operation to enable a standby state of the normal channel allocation to be clear, and then, performing the extended call process.

The method for dynamically allocating a channel at an extended coverage of a base transceiver station further comprises the steps of: (j) comparing, during the normal call process by using the normal channel allocated in step (f), the RTD value to a normal-add value, performing, in case that the RTD value is less than the normal-add value, a region add operation to additionally allocate the normal channel, and, returning, in case that the RTD value is larger than the normal-add value, to the extended call processing; (k) comparing the RTD value to a swap-to-normal value, performing, in case that the RTD value is less than the swap-to-normal value, a region swap to enable the extended channel to be inactive, and simultaneously, to enable the normal channel to be active, and returning, in case that the RTD value is larger than the swap-to-normal value, to the step of comparing the RTD value to the swap-to-normal value; and (l) comparing the RTD value to an extend-drop value, and performing, in case that the RTD value is less than the extend-drop value, a region drop operation to enable the standby state of the extended channel allocation to be clear, and processing the normal call process.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Preferred embodiments of the present invention will now be described in detail, with reference to the accompanying drawings.

Figure 2A:
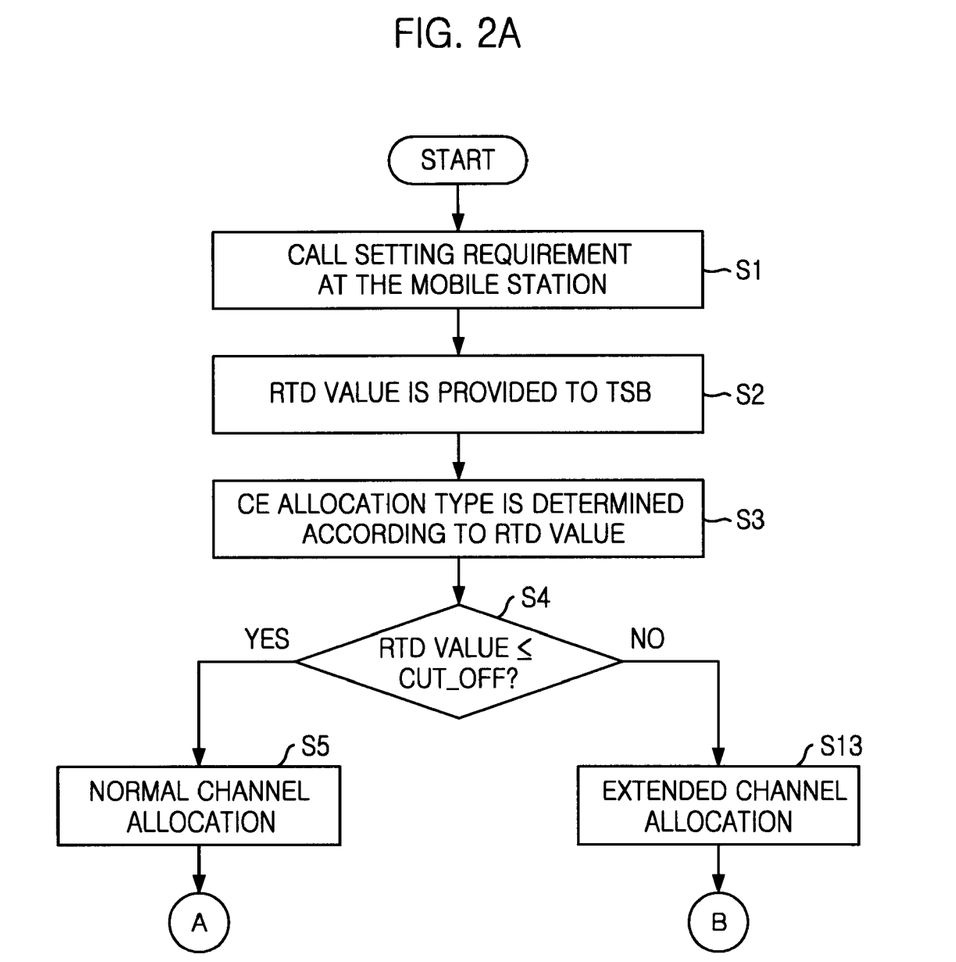
FIGS. 2A and 2B show a flowchart of dynamically allocating a channel at an extended coverage of a base transceiver station in a mobile communication station in accordance with the present invention.
Figure 2B:
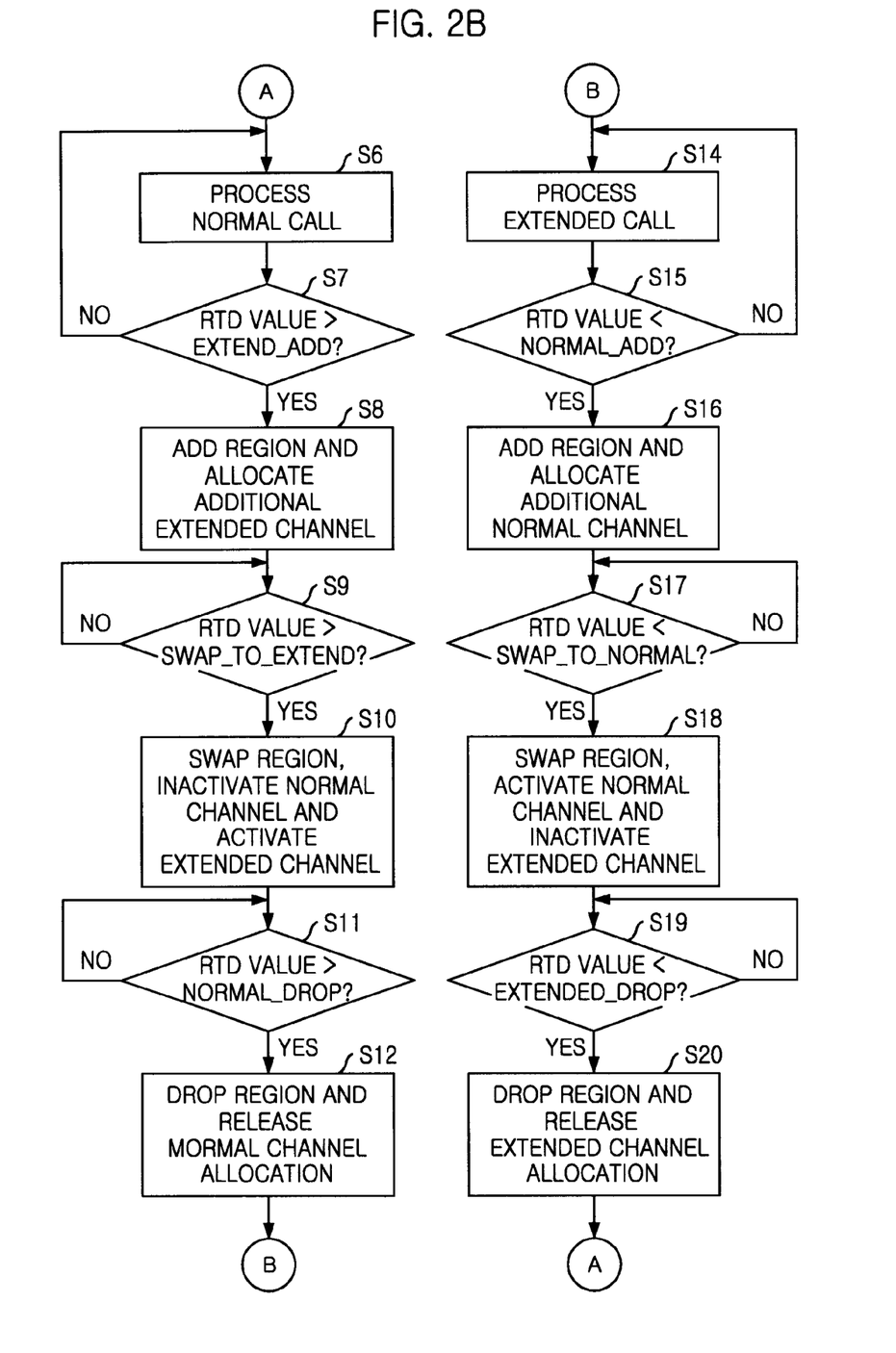

Referring to FIGS. 2A and 2B, there is shown a flowchart of dynamically allocating a channel at an extended coverage of a base transceiver station in a mobile communication station in accordance with the present invention.

In case that an origination (a call setting requirement) or a page response is received from the mobile station 1 (S1), a channel element 5 contained at the base transceiver station periodically measures a RTD value between the base transceiver station 2 and the mobile station 1 while the call is set and maintained. The measured RTD value is provided to a TSB (Transcoder & Selector Bank) 7 at the base station controller 3 (S2).

At the TSB 7, the position of the mobile station 1 is checked based on the RTD value to determine a CE allocation type (S3).

At this time, in case that the RTD value is larger than a threshold value (or a cutoff), it is determined that the mobile station is located within the extended region. In case that the RTD value is less than the threshold value, it is determined that the mobile station is located within the normal region.

Base on the determination result, the extended CE or the normal CE is allocated. That is, the RTD value is compared to the cutoff value (S4). In case that the RTD is less than the cutoff, the normal channel is allocated (S5), and, otherwise, the extended channel is allocated (S13).

Thereafter, when the normal channel is allocated in the step S5, a normal call process is performed (S6). While the normal call process is performed, the RTD value is compared to an extended add value EXTEND_ADD (S7). In case that the RTD value is larger than the extended add value EXTEND_ADD, a region add operation is performed to additionally allocate an extended channel (S8), and, otherwise, the processing returns to the step S6.

After the region add operation has been performed at the step S8, the RTD value is compared to a swap-to-extend value (S9). In case that the RTD value is larger than the swap-to-extend value, a region swap operation is performed to enable the normal channel to be inactive and to enable the extended channel to be active (S10). In case that the RTD value is not larger than the swap-to-extend value, the processing returns to the step S9.

After processing the step S10, the RTD value is compared to a normal drop value NORMAL_DROP. In case that the RTD value is larger than the normal drop value, a region drop operation is performed to enable the standby state of the normal channel allocation to be clear (S12). And then, the extended call processing is performed (S14).

On the other hand, after the extended channel is allocated at step S13, the extended call processing is performed at step S14. While the extended call processing is performed at step S14, the RTD value is compared to a normal-add value NORMAL_ADD. In case that the RTD value is less than the normal-add value, the region add operation is performed to additionally allocate the normal channel (S16). In case that the RTD value is not less than the normal-add value, the processing returns to the extended call processing at the step S14.

After processing the step S16, the RTD value is compared to a swap-to-normal value SWAP_TO_NORMAL. In case that the RTD value is less than the SWAP_TO_NORMAL, the region swap is performed to enable the extended channel to be inactive, and simultaneously, to enable the normal channel to be active (S18). In case that the RTD value is not less than the SWAP_TO_NORMAL, the processing returns to the step S17.

After processing the step S18, the RTD value is compared to an extend-drop value EXTENDED_DROP. In case that the RTD value is less than the EXTENDED_DROP, a region drop operation is performed to enable the standby state of the extended channel allocation to be clear (S20). After processing the step S20, the processing proceeds to the normal call processing at the step S6.

Hereinafter, a call processing operation of allocating a channel at a normal region and an extended region of a base transceiver station in a mobile communication station in accordance with the present invention is described with reference to FIG. 3.

Figure 3:
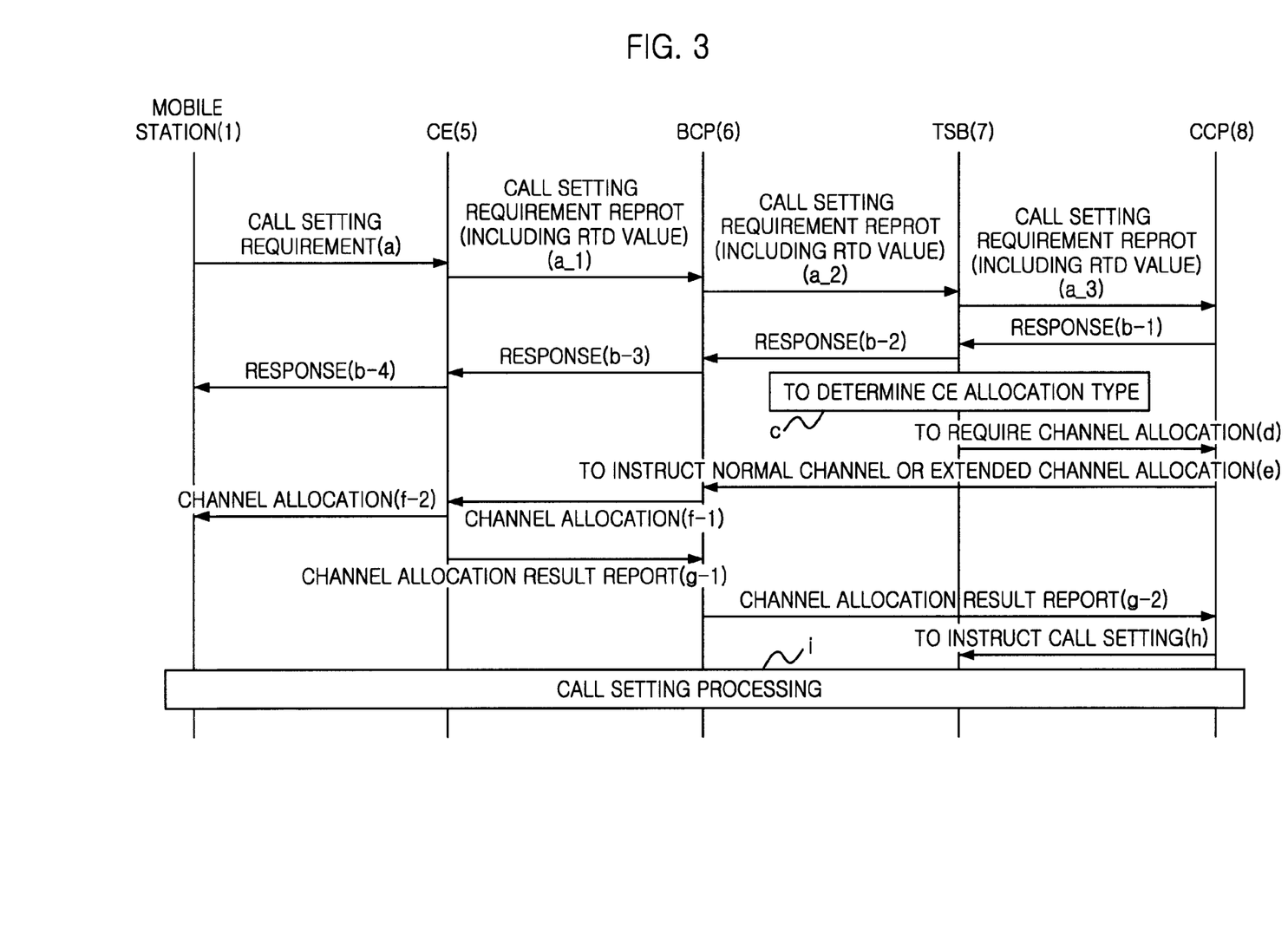
FIG. 3 describes a flowchart of allocating a channel at a normal region and an extended region of a base transceiver station in a mobile communication station in accordance with the present invention.

As shown in FIG. 3, in case that there is an origination(a call setting requirement) (a), a channel element (CE) 5 contained at the base transceiver station 2 reports both the call setting requirement and a RTD value to a BCP (BTS Control Processor) 6 at the base transceiver station 2 (a-1). And then, both the call setting requirement and the RTD value are reported from the BCP 6 to the TSB 7 at the base station controller 3. Thereafter, the both the call setting requirement and the RTD value are reported from the TSB 7 to a CCP (call control processor) 8 at the base station controller 3.

Thereafter, the CCP 8 provides a response corresponding to the reported call setting requirement and RTD value, through the TSB 7, the BCP 6 and the CE 5 to the mobile station (b-1, b-2, b-3 and b-4).

And then, at the TSB 7, the position of the mobile station 1 is checked based on the reported RTD value to determine a CE allocation type (c). Based on the determination result, the TSB 7 requires a channel allocation to the CCP 8 (d).

According to the channel allocation requirement of the TSB 7, the CCP 8 instructs the normal or the extended channel allocations to the BCP 6 based on the allocation type determined at the TSB 7 (e).

Thereafter, when the channel allocation is determined to be possible, the BCP enables the CE 5 to be allocated with the normal or the extended channels (f-1), and then enables the mobile station 1 to be allocated with the normal or the extended channels (f-2).

As soon as the channel allocation result is reported from the CE 5 and the BCP 6, the CCP 8 instructs the call setting to the TSB 7 (h). And then, the CCP 9 processes the call processing between the mobile station 1, the CE 5, the BCP 6, the TSB 7 and CCP 8 (i).

Hereinafter, the call operations between the blocks in case of the region add, the region drop and the region swap operations at the handoff region of the extended coverage of the base transceiver station in accordance with the present invention, are described with reference to FIGS. 4, 5 and 6.

When the mobile station moves from the normal or the extended regions to the handoff region, a region handoff is operated to perform an amicable call process.

The region handoff comprises an add, a swap and a drop processes. The region handoff is performed through the CE 5, the BCP 6, and the TSB 7 after determining the process generation point which is determined based on the RTD value at the TSB 7.

That is, in FIGS. 2A and 2B, the region add operation is shown at the steps S8 and S16, the region drop operation is shown at the steps S12 and S20 and the region swap operation is shown at the steps S10 and S18.

Figure 4:
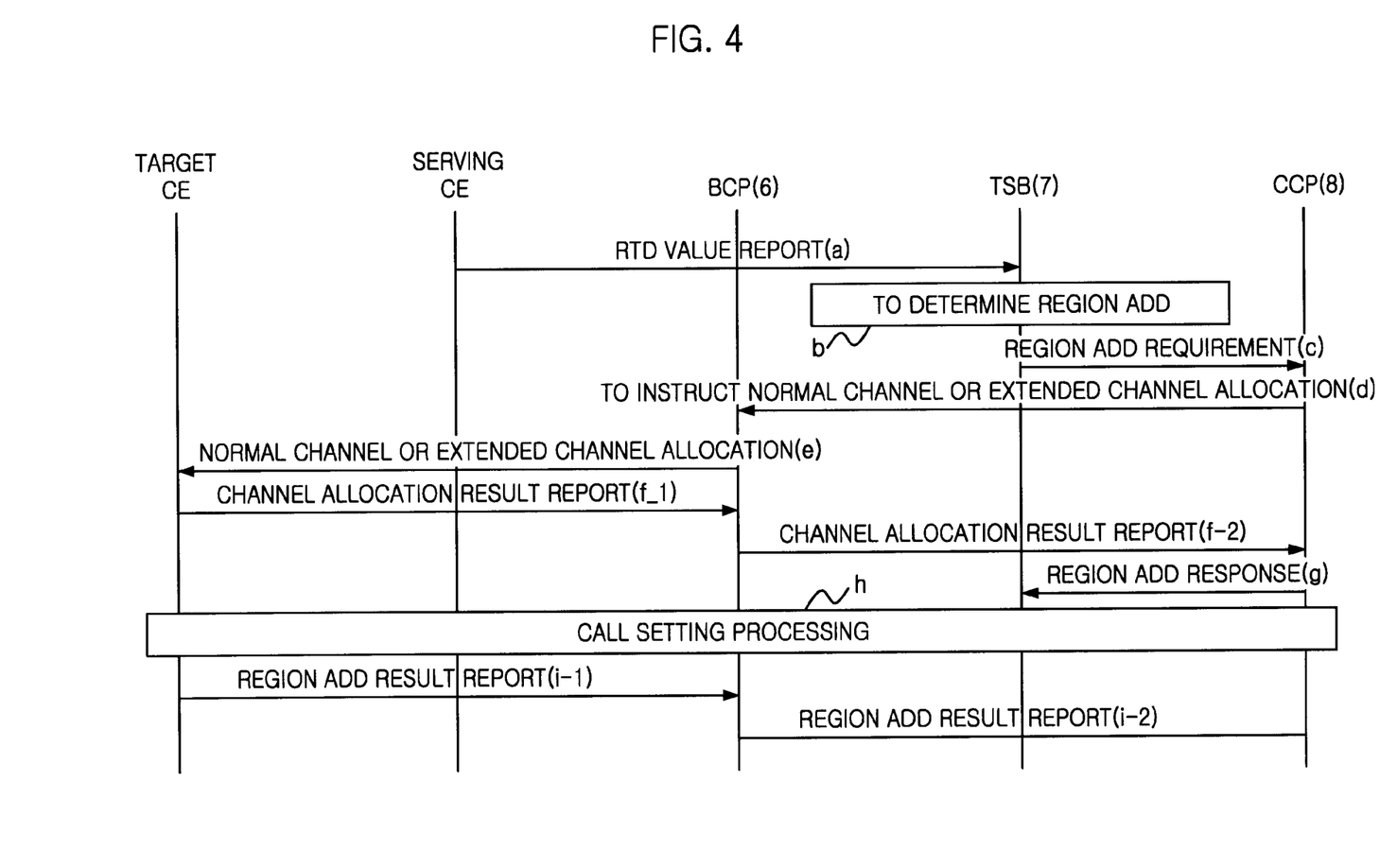
FIG. 4 depicts a flowchart of processing a region-add call process at a handoff region of a base transceiver station in a mobile communication station in accordance with the present invention.

As shown in FIG. 4, the region add operation of the call processes between blocks is as follows. A serving CE, which processes a current call, periodically reports the RTD value to the TSB 7 (a). The TSB 7 determines the start point of the region add operation according to the reported RTD value (b) (the steps S7 and S15 in FIGS. 2A and 2B). When there occurs the start point, the TSB 7 requires the region add handoff to the CCP 8 (c).

The required call setting is determined to be possible at the CCP 8, the CCP 8 instructs the normal or the extended channel allocations to the BCP 6 (d) to enable the target CE to allocate the normal or the extended channels (e).

Thereafter, as soon as the channel allocation result is reported from the target CE and the BCP 6 (f-1 and f-2), the CCP 8 transmits the response corresponding to the region add handoff to the BCP 6 (g). And then, the call setting between the CE 5, the BCP 6, the TSB 7 and the CCP 8 is processed (h). After the call setting is end, the target CE finally reports the region add result to the BCP 6 (i-1). And then, the BCP 6 reports the result reported from the target CE to the CCP 8 (i-2).

Figure 5:
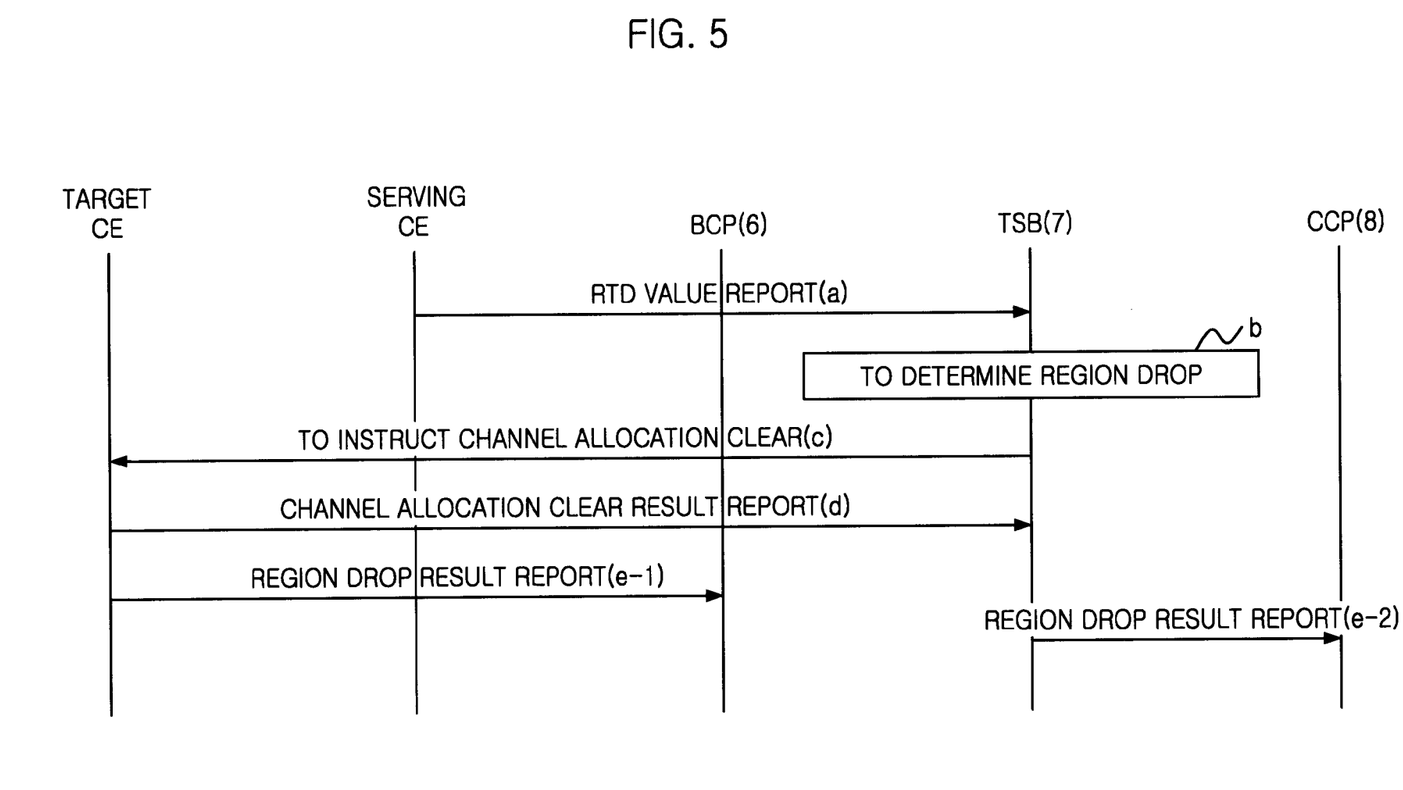
FIG. 5 is a flowchart of processing a region-drop call process at a handoff region of a base transceiver station in a mobile communication station in accordance with the present invention.

As shown in FIG. 5, the region drop operation of the call processes between blocks is as follows. A serving CE, which is in an active state and interacts with the mobile station 1, periodically reports the RTD value to the TSB 7 (a). The TSB 7 determines the start point of the region drop operation according to the reported RTD value (b)(the steps S11 and S19 in FIGS. 2A and 2B). When there occurs the start point of the drop operation, the TSB 7 instructs a channel allocation clear to the target CE which is in a standby state (c). The standby state means that the cell site modem is set but does not interact with mobile station 1.

After the channel allocation clear result is reported from the target CE (d) to TSB 7, both the BCP 6 and the CCP 8 also receives the region drop result from the target CE and the TSB 8 (e-1 and e-2).

Figure 6:
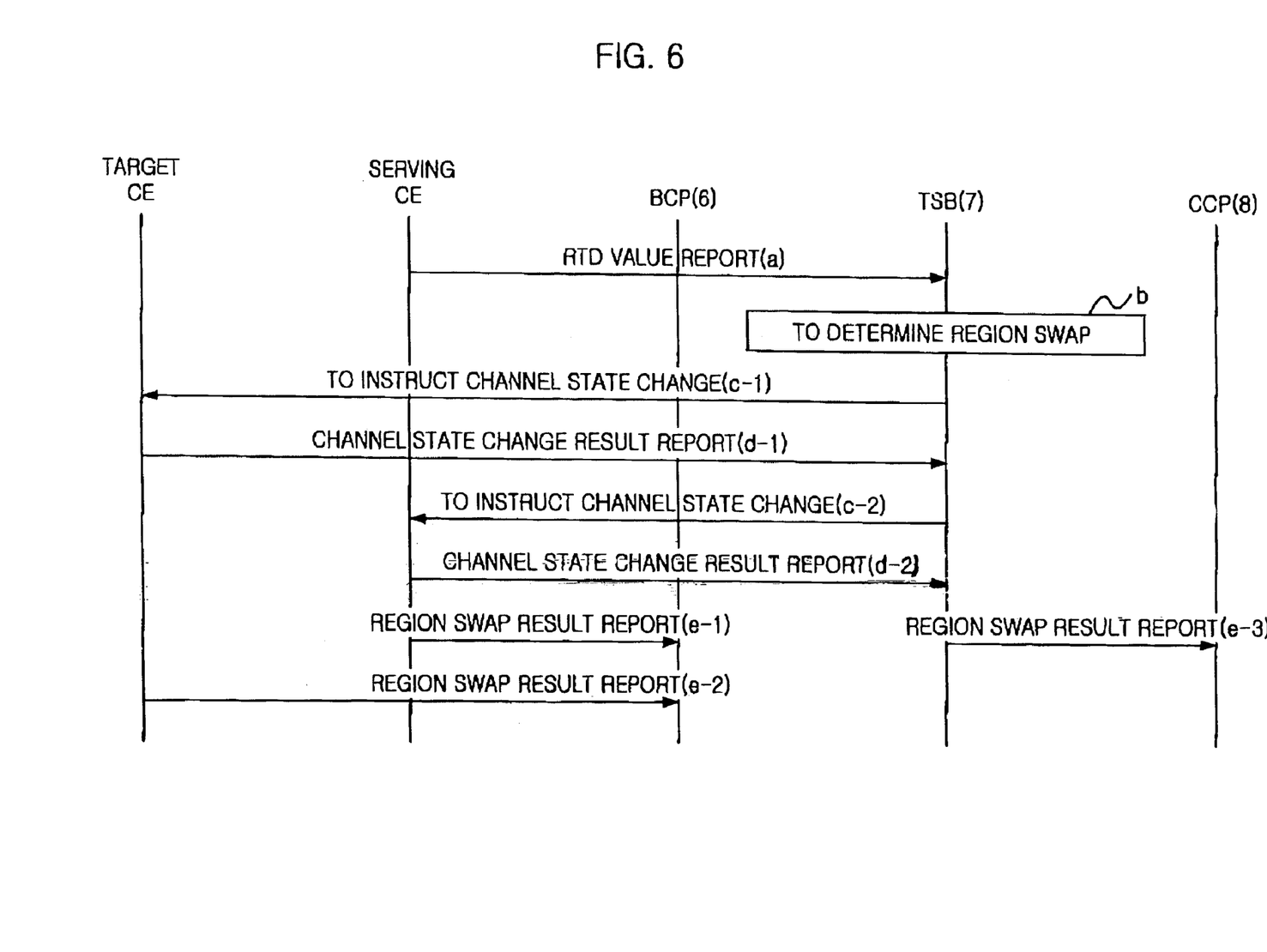
FIG. 6 describes a flowchart of processing a region-swap call process at a handoff region of a base transceiver station in a mobile communication station in accordance with the present invention.

As shown in FIG. 6, the region swap operation of the call processes between blocks is as follows.

On the other hand, the added CE firstly is in a standby state, but the standby state is changed to the active state after a predetermined point. And then, the added CE performs a modulation/demodulation operation to interact with the mobile station 1. At this time, a state of one CE is changed from the standby state to the active state, the other CE have to be changed from the active state to the standby state.

As described above, the state change process is called as the swap.

A serving CE, which is in an active state and interacts with the mobile station 1, periodically reports the RTD value to the TSB 7 (a). The TSB 7 determines the start point of the region swap operation according to the reported RTD value (b) (the steps S9 and S17 in FIGS. 2A and 2B). When there occurs the start point of the swap operation, the TSB 7 instructs a channel state change to the target CE which is in a standby state so as to change the standby state to the active state (c-1). And also, the TSB 7 instructs a channel state change to the serving CE so as to change the active state to the standby state (c-2).

After the channel state change result is reported from the target CE and the serving CE (d-1 and d-2) to TSB 7, the result is also reported from both the serving and the target CEs to the BCP 6 and reported from the TSB 7 to the CCP 8 (e-1, e-2 and e-3).

The advantages of the invention are numerous. Different embodiments or implementations may yield one or more of the following advantages. One of advantages of the invention is that the channel allocation is dynamically allocated according to a channel type which is necessary on a call set up at each of the regions. Thereby, it is possible to reduce an unnecessary channel allocation and an occupation time of the channel element. This enables the capacity of the system to be increased.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of dynamically allocating a channel at an extended coverage of a base transceiver station in a mobile communication system, comprising the steps of:
    (a) measuring, in case that a call setting requirement or a page response is received from the base transceiver station, a round trip delay (RTD) value at a channel element (CE) of the base transceiver station to report a measured RTD value to a transcoder & selector bank (TSB) of a base station controller;
    (b) confirming a position of the mobile station based on the measured RTD value and determining a CE allocation type corresponding to the position of the mobile station;
    (c) if the RTD value is larger than a cutoff, recognizing that the mobile station is located within an extended region, thereby allocating an extended CE;
    (d) performing an extended call process by using the extended CE;
    (e) if the RTD value is less than the cutoff, recognizing that the mobile station is located within a normal region, thereby allocate a normal CE; and
    (f) performing a normal call process by using the normal CE.

2. The method as recited in claim 1, further comprising the steps of:
    (g) comparing, during the normal call process according to a normal channel allocated in step (e), the RTD value to an extended add value, and, performing, in case that the RTD value is larger than the extended add value, an extended add operation to additionally allocate an extended channel, and, otherwise, returning to the step (f);
    (h) comparing the RTD value to a swap-to-extend value, performing, in case that the RTD value is larger than the swap-to-extend value, a region swap operation to enable the normal channel to be inactive and simultaneously to enable the extended channel to be active, and performing, in case that the RTD value is less than the swap-to-extend value, comparing the RTD value to the swap-to-extend value; and
    (i) comparing the RTD value to a normal drop value, performing, in case that the RTD value is larger than the normal drop value, a region drop operation to enable a standby state of the normal channel allocation to be clear, and then, performing the extended call process.

3. The method as recited in claim 2, further comprising the steps of:
    (j) comparing, during the normal call process by using the normal channel allocated in step (f), the RTD value to a normal-add value, performing, in case that the RTD value is less than the normal-add value, a region add operation to additionally allocate the normal channel, and, returning, in case that the RTD value is larger than the normal-add value, to the extended call processing;
    (k) comparing the RTD value to a swap-to-normal value, performing, in case that the RTD value is less than the swap-to-normal value, a region swap to enable the extended channel to be inactive, and simultaneously, to enable the normal channel to be active, and returning, in case that the RTD value is larger than the swap-to-normal value, to the step of comparing the RTD value to the swap-to-normal value; and
    (l) comparing the RTD value to an extend-drop value, and performing, in case that the RTD value is less than the extend-drop value, a region drop operation to enable the standby state of the extended channel allocation to be clear, and processing the normal call process.

4. The method according to claim 1, where the step (a) includes the steps of:
    (a1) reporting, in case that there is a call setting requirement, both a call setting requirement and a RTD value from the CE to a BTS Control Processor (BCP), reporting both the call setting requirement and the RTD value from the BCP to the TSB, and reporting the both the call setting requirement and the RTD value from the TSB to a call control processor (CCP);
    (a2) providing a response corresponding to the reported call setting requirement and the RTD value from the CCP to the TSB, and providing the response through the BCP and the CE to the mobile station.

5. The method of claim 2, wherein the step (g) includes the steps of:
    (g1) if the RTD value reported from the serving CE is larger than the extended-add value, at the TSB, requiring a region add handoff to the CCP;
    (g2) instructing, in case that the required call setting is determined to be possible at the CCP, the extended channel allocations to the BCP to enable the target CE to allocate the extended channels;
    (g3) transmitting, as soon as the channel allocation result is reported from the target CE and the BCP, the response corresponding to the region add handoff to the BCP, and processing the call setup between the CE, the BCP, the TSB and the CCP; and
    (g4) reporting, after the call setting is end at step (g3), the region add result from the target CE to the BCP and reporting the result from the BCP to the CCP.

6. The method of claim 2, wherein the step (h) includes the steps of:
    (h1) if the RTD value reported from the CE is larger than the swap-to-extend value, at the TSB, instructing a channel state change to the target CE which is in a standby state so as to change the standby state to the active state, and instructing another channel state change to the serving CE so as to change the active state to the standby state; and (h2) reporting, after the channel state change result is reported from the target CE and the serving CE to the TSB, the result from both the serving and the target CEs to the BCP, and reporting the region swap result from the TSB to the CCP.

7. The method as recited in claim 2, wherein the step (i) includes the steps of:

(i1) if the RTD value reported from the CE is larger than the normal-drop value, at the TSB, instructing a channel allocation clear to the target CE, which is in a standby state, to enable the corresponding channel to be clear; and (i2) reporting, after the channel allocation clear result is reported from the target CE to the TSB, the region drop result from the target CE and the TSB to the BCP and the CCP.

8. The method of claim 3, wherein the step (j) includes the steps of:

(j1) if the RTD value reported from the serving CE is less than the normal-add value, at the TSB, requiring a region add handoff to the CCP;

(j2) instructing, in case that the required call setting is determined to be possible at the CCP, the extended channel allocations to the BCP to enable the target CE to allocate the extended channels;

(j3) transmitting, as soon as the channel allocation result is reported from the target CE and the BCP, the response corresponding to the region add handoff to the BCP, and processing the call setup between the CE, the BCP, the TSB and the CCP; and (j4) reporting, after the call setup is end at step (j3), the region add result from the target CE to the BCP and reporting the result from the BCP to the CCP.

9. The method of claim 3, wherein the step (k) includes the steps of:

(k1) if the RTD value reported from the CE is less than the swap-to-normal value, at the TSB, instructing a channel state change to the target CE which is in a standby state so as to change the standby state to the active state, and instructing another channel state change to the serving CE so as to change the active state to the standby state; and (k2) reporting, after the channel state change result is reported from the target CE and the serving CE to the TSB, the result from both the serving and the target CEs to the BCP, and reporting the region swap result from the TSB to the CCP.

10. The method as recited in claim 3, wherein the step (l) includes the steps of:

(l1) if the RTD value reported from the CE is less than the extend-drop value, at the TSB, instructing a channel allocation clear to the target CE, which is in a standby state, to enable the corresponding channel to be clear; and (l2) reporting, after the channel allocation clear result is reported from the target CE to the TSB, the region drop result from the target CE and the TSB to the BCP and the CCP.

* * * * *